July 5, 1927.
C. TREVANI
STAKE HOLDER
Filed Sept. 2, 1926
1,634,762
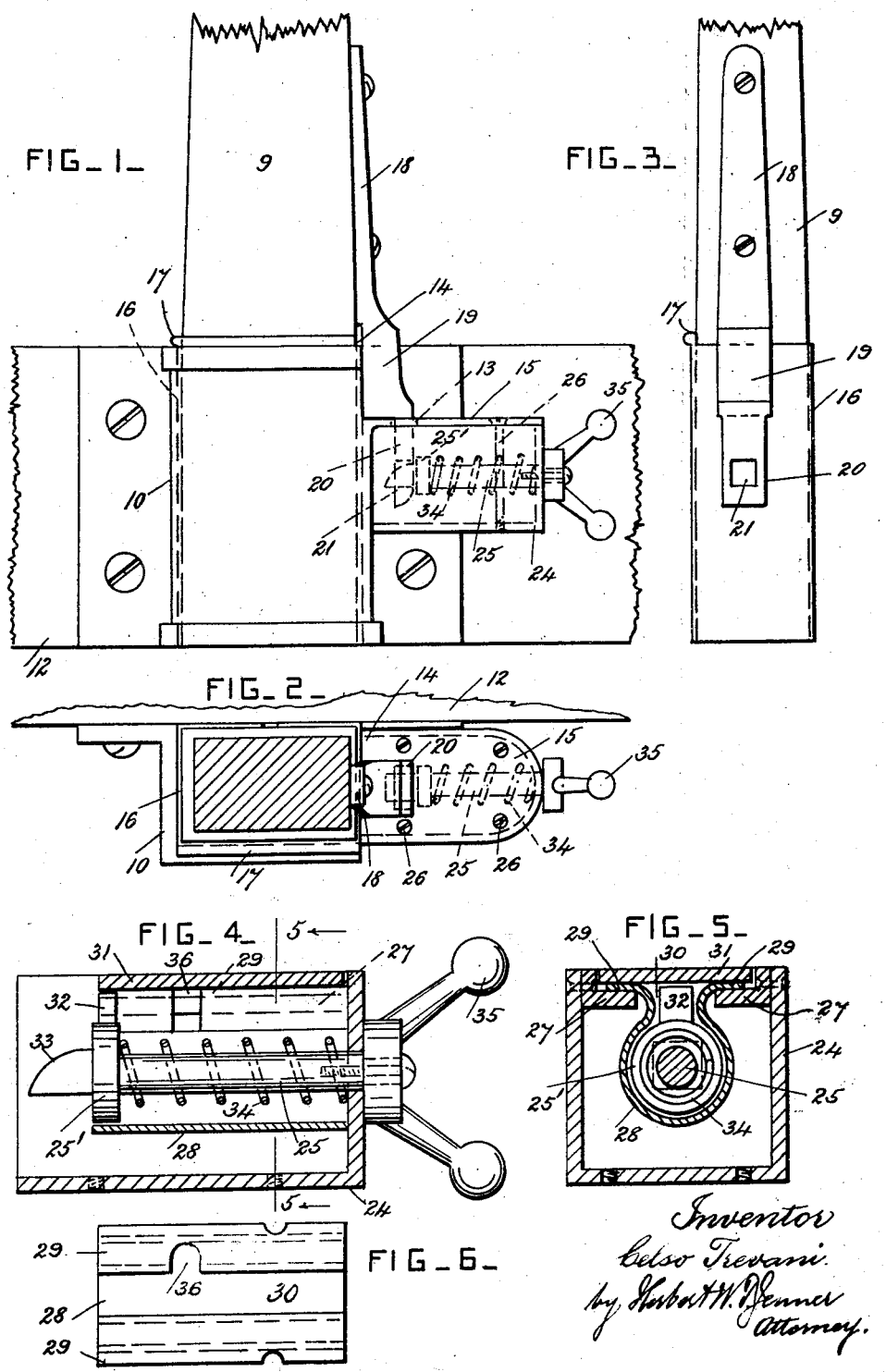

Patented July 5, 1927.

1,634,762

UNITED STATES PATENT OFFICE.

CELSO TREVANI, OF HOPEDALE, MASSACHUSETTS.

STAKEHOLDER.

Application filed September 2, 1926. Serial No. 133,164.

This invention relates to devices for holding stakes on the body portions of motor trucks, wagons and other vehicles; and it consists in the novel construction and combination of the parts hereinafter fully described and claimed whereby the stake is locked to a socket on the body portion, and may be disengaged, and removed and replaced as often as desired.

In the drawings, Figure 1 is a front view of a portion of a stake and its socket constructed according to this invention. Fig. 2 is a plan view of the same showing the stake in section. Fig. 3 is a side view of the lower part of the stake removed from the socket. Fig. 4 is a longitudinal section through the locking device removed from the socket. Fig. 5 is a cross-section through the locking device, taken on the line 5—5 in Fig. 4. Fig. 6 is a plan view of the guide for the locking bolt.

A socket 10 is secured to the body portion 12 of the vehicle, and is preferably rectangular in form. One side portion of the socket has a gap 14 at its top, and a plate 15 projects horizontally from the side portion at the bottom of the gap, and has a hole 13 in it. The stake 9 preferably has its lower end portion shod with a metal frame 16 which extends around it and is secured to it. The frame has a stop 17 on one side which rests on the top edge of the socket when the frame and stake are slid into place. An arm 18 is secured to one side of the stake, and has an enlarged portion 19 and a locking lug 20 at its lower end which project below the top of the frame 16. The enlarged portion slides in the gap 14, and the lug 20 is offset from the frame and has a hole 21 for the locking bolt.

A housing 24 for the locking bolt 25 is provided, and is secured to the underside of the plate 15 by bolts 26. The housing has lugs 27 which project horizontally from its front and rear sides. A tubular guide 28 is provided, and has lugs 29 which rest on the lugs 27, and have a guide channel 30 between them. A cover plate 31 is placed over the lugs 29, between them and the plate 15. The locking bolt 25 slides in a hole in the housing, and has a head 25' which slides in the guide 28. This head has an upwardly projecting lug 32 which slides in the channel 30, and the head also has a beveled end portion 33 which engages with the hole in the locking lug 20. A helical spring 34 encircles the locking bolt, and normally holds it in engagement with the locking lug. The projecting end portions of the locking bolt is provided with an operating handle 35. A retaining notch 36 is formed in the guide for the locking bolt at one side of the guide channel 30. The locking lug 20 of the locking arm is slid through the hole 13 in the plate 15 when the stake is slid into the socket 10.

The lower end of the locking lug 20 and the end 33 of the locking bolt are beveled in suitable directions so that when the stake is slid into the socket it is automatically locked therein by the locking bolt, and the stake cannot be jarred out of place by the motion of the truck and lost. The stake is released by retracting the locking bolt by hand, and when retracted the locking bolt may be held in its retracted position by turning it on its axis until the lug 32 slips into the retaining notch 30 in the tubular guide.

What I claim is:

1. In a stake holder, a stake socket, a stake slidable in the socket, a locking arm secured to the stake and having a locking lug at its lower end, and a locking device for the stake comprising a housing secured to the socket, a tubular guide supported in the housing and having a guide channel at its upper side provided with a retaining notch, a locking bolt having a head slidable in the tubular guide and provided with a retaining lug slidable in the guide channel and free to engage with the said notch, said locking bolt having a handle at its outer end and a beveled portion at its inner end for engaging automatically with the locking lug, and a spring which presses the locking bolt towards the locking lug.

2. In a stake holder, a stake socket having a gap at the top of one of its sides and a plate which projects horizontally therefrom at the bottom of the gap and has a hole in it, a locking arm secured to the stake and having a locking lug at its lower end which projects through the said hole, and a locking device secured to the underside of the said plate and provided with a retractible spring-pressed bolt which engages with the locking lug.

3. In a stake holder, a stake socket, a stake slidable in the socket, a locking arm having its upper part rigidly secured to the stake and provided with a lower end portion which projects below the top of the socket and has a locking lug at its bottom which is offset from the side of the socket, and a retractible spring-actuated locking bolt supported by the socket and engaging with the locking lug.

4. A stake holder as set forth in claim 3, the contacting surfaces of the locking bolt and the locking lug being beveled so that the stake is locked automatically to the socket when slid downwardly in it.

In testimony whereof I have affixed my signature.

CELSO TREVANI.